United States Patent [19]

Mourier

[11] E Re. 30,422

[45] Reissued Oct. 21, 1980

[54] GRAPHIC RECORDER

[75] Inventor: Jean Mourier, Savigny-sur-Orge, France

[73] Assignee: Benson-France, Fontenay-sous-bois, France

[21] Appl. No.: 2,144

[22] Filed: Jan. 9, 1979

Related U.S. Patent Documents

Reissue of:

[64] Patent No.: 3,305,873
Issued: Feb. 21, 1967
Appl. No.: 408,159
Filed: Nov. 2, 1964

[30] Foreign Application Priority Data

Nov. 8, 1963 [FR] France ..... 63.953207

[51] Int. Cl.[3] ..... G01D 9/38; G01D 15/28

[52] U.S. Cl. ..... 346/112; 242/185; 242/75.52; 346/136

[58] Field of Search ..... 346/136, 112; 242/182, 242/183, 184, 185, 189, 190, 75.51, 52, 67.3, 67.4; 226/95, 97, 118; 360/71, 83, 90

[56] References Cited

U.S. PATENT DOCUMENTS

| | | | |
|---|---|---|---|
| 2,147,421 | 2/1939 | Bendz . | |
| 2,690,951 | 10/1954 | Moore | 346/136 |
| 2,764,464 | 9/1956 | Morton | 346/112 |
| 2,831,678 | 4/1958 | MacNeill . | |
| 2,837,330 | 6/1958 | Lawrence | 226/95 |
| 2,877,012 | 3/1959 | Angel . | |
| 2,927,789 | 3/1960 | Walsh | 226/97 X |
| 2,939,757 | 6/1960 | MacDonald | 346/136 X |
| 2,954,911 | 10/1960 | Baumeister | 226/95 |
| 2,998,206 | 8/1961 | Pendleton . | |
| 3,015,536 | 1/1962 | Nielsen | 346/136 |
| 3,016,207 | 1/1962 | Comstock . | |
| 3,027,059 | 3/1962 | Streeter | 226/45 |
| 3,051,406 | 8/1962 | Wehde . | |
| 3,062,464 | 11/1962 | Moose . | |
| 3,091,380 | 5/1963 | Harris . | |
| 3,112,473 | 11/1963 | Wicklund | 226/118 X |
| 3,163,486 | 12/1964 | Tomes | 346/33 M |
| 3,202,373 | 8/1965 | Reader . | |
| 3,203,635 | 8/1965 | Rayfield . | |
| 3,225,990 | 12/1965 | Barbeau . | |
| 3,227,457 | 1/1966 | Tada | 360/83 |
| 3,251,563 | 5/1966 | Kleist . | |
| 3,261,563 | 7/1966 | Aweida . | |

FOREIGN PATENT DOCUMENTS

| | | |
|---|---|---|
| 1133810 | 11/1956 | France . |
| 970810 | 9/1964 | United Kingdom . |

*Primary Examiner*—Joseph W. Hartary
*Attorney, Agent, or Firm*—Caesar, Rivise, Bernstein & Cohen

5 Claims, 6 Drawing Figures

GRAPHIC RECORDER

Matter enclosed in heavy brackets [ ] appears in the original patent but forms no part of this reissue specification; matter printed in italics indicates the additions made by reissue.

The present invention has for its object a graphic recorder intended to operate automatically from numerical inputs.

The graphic recorders of this kind which exist at the present time comprise a tracing head capable of moving in two opposite directions above a sheet of paper which can in turn be moved by means of a driving drum in two opposite directions which are however perpendicular to the movements of the tracing head.

A paper unwinding and winding device comprises two driving rollers having two directions of rotation and, following a known arrangement, the rollers and the driving drum are each located at one of the apices of a triangle.

The tracing head reproduces the ordinates and the driving drum forms the abscissae.

The numerical impulses are applied to two independent reversible motors which drive step-by-step the tracing head and the driving drum.

This driving drum generally has a relatively large diameter, which presents a non-negligible problem of inertia, and it is known that the polar inertia of a drum or cylinder is equal to $0.098d^4$ where d is the diameter.

The graphic recorder in accordance with the invention comprises a driving cylinder of small diameter which reduces the phenomenon of inertia to a very considerable extent.

This reduction in the diameter of the driving cylinder is made possible by the device of two intermediate loops formed in the paper on each side of the driving cylinder.

In order to render the driving cylinder completely independent of reciprocal action of the rollers on each other through the intermediary of the sheet of paper, the recorder according to the invention comprises a device for reading and correcting loops. This reading and loop corrector device has for its purpose to keep constantly in balance the two loops which are drawn-in by a suction system.

The device for reading and correcting loops can be constituted by at least two pairs of photo-electric cells arranged in pairs at different levels, the position of the tops of the loops varying between two limits defined by the two levels of the cells.

The suction device may be constituted by a simple fan of adequate power, and contributes in obtaining maximum winding of the paper on the driving cylinder of small diameter and therefore of low inertia.

Other characteristic features and advantages of the present invention will be brought out from the description which follows below with reference to the accompanying drawings, in which.

Figure 2:
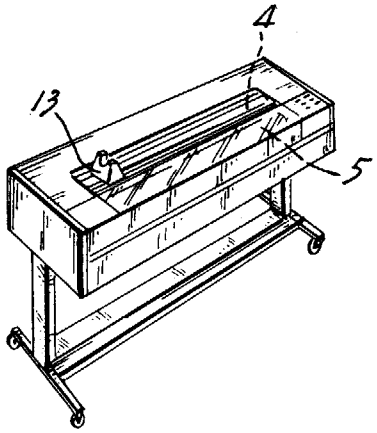
FIGS. 1 to 3 show three general arrangements of the graphic recorder in accordance with invention.

The graphic recorder according to the invention comprises in known manner a tracing head consisting of a slider 1 carrying a pen 2. This pen is in contact with a sheet of paper 3 resting partly on a driving cylinder 4. On each side of this cylinder, the sheet of paper is wound on to two winding and unwinding rollers 5.

According to the invention, the axis of the driving cylinder and those of the rollers 5 are preferably arranged in the same plane in order to produce between each of the rollers 5 and the driving cylinder a loop 6, the formation of which is facilitated by a suction system which may be constituted by a simple fan 7.

The diameter of the driving cylinder 4 is small so as to reduce as far as possible the phenomenon of inertia.

The suction of the loops contributes to a better contact of the paper round the cylinder 4, this contact being extended over more than half of its circumference. This arrangement permits a satisfactory drive of the paper by this cylinder, which is provided with teeth 4a engaging in corresponding perforations in the paper.

In order to render the driving cylinder completely independent of the interactions which may take place between the rollers 5, the loops 6 are balanced by means of a reader-corrector device. This device is constituted by at least two pairs of photo-electric cells arranged at different levels. The first pair of cells 8 operates when a beam of light coming from a light source 9 is cutoff. The second pair of cells 10 acts by uncovering the emission of light.

The two pairs of cells enable the positions of the tops of the loops to be read between two levels B and C, the level A corresponding to an equilibrium between the two loops 6.

The driving cylinder 4 and the tracing head 1 are each driven by a reversible step-by-step motor.

The cylinder 4 is driven by a step-by-step motor 11 with a reduction gear 12.

The tracing head is fixed on a slider 13 arranged to slide on guiding rods 14.

A step-by-step motor 15 with a reduction gear 16 acts on a cable 17 stretched between a driving reel 18 keyed on the output shaft of the reduction gear 16 and a return pulley 19, and the slider 13 is fixed to one of the sides of the cable.

In accordance with the input signal received by the reversible motor 11, the driving cylinder 4 rotates either in the direction of the arrow f1 or in the direction of the arrow f2.

The input signal which reaches the motor 15 results in a displacement of the slider, either in the direction of the arrow f3 or in the direction of the arrow f4.

Prolonged rotation of the driving cylinder 4 in either direction f1 or f2 can cause an elongation of the loop located downstream of this cylinder. An extended loop 6 of paper has been shown in FIG. 6 in full lines and downstream of the arrow f1. The top of this elongated loop cuts-off the theoretical beam F coming from the source of light 9, which normally reaches one of the cells of the pair of cells 8. In other words, the top of this loop has reached the level B or has gone beyond it. The cell 8 considered which acts when the light is cutoff, causes rotation in the direction fB of a motor 20 driving the roller 5 located, in the case considered, on the downstream side of the cylinder 4.

This constant speed motor 20 then drives the paper so as to produce a shortening of the loop.

Figure 6:
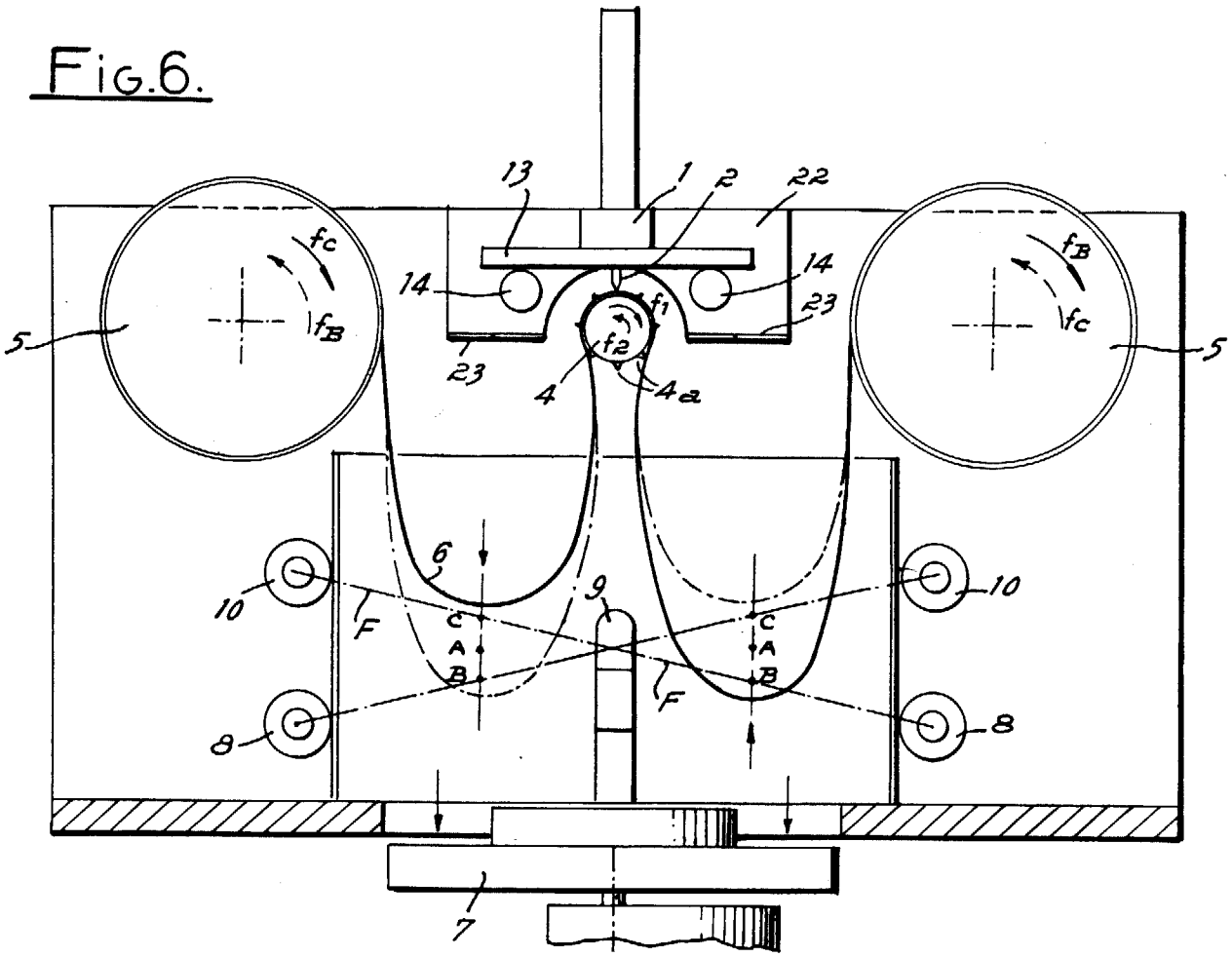
FIG. 6 shows a side elevation of the recorder, seen from the interior.

An unconsidered shortening of the other loop is shown in full lines in FIG. 6.

The shortening of the loop exposes the beam F issuing from the source of light 9 which normally reaches one of the cells of the pair of cells 10. This cell which acts on the uncovering of the beam of light causes the rotation of a motor 21 capable of driving the roller 5 located on the upstream side of the cylinder 4. The rotation at constant speed of the roller 5 considered, in the direction of the arrow fC, produces the desired elongation of the upstream loop. As the loop extends, its top passes beyond the level C which coincides with the drive of the upstream roller 5 in the direction fC.

The balance between the two upstream and downstream loops is ideal when the tops of the loops are located at the level A. The loop considered up to the present as being the downstream loop may be subjected to an inconsidered shortening passing beyond the level C, which results in rotation in the direction fC of the roller 5 to which it is attached. This shortening may be caused by prolonged rotation of the driving cylinder 4 in the direction of the arrow f2. This same prolonged rotation in this direction can cause an elongation of the other loop.

The upstream and downstream loops corresponding to the direction of rotation f2 are shown in chain-dotted lines in FIG. 6.

Figure 3:
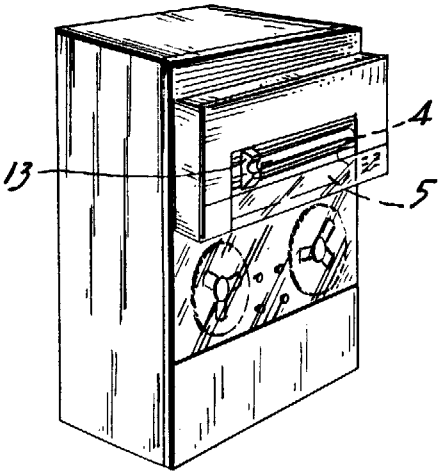
Figure 1:
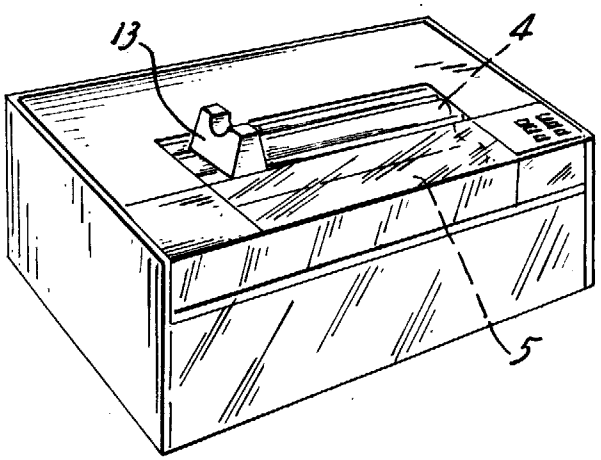
Figure 4:
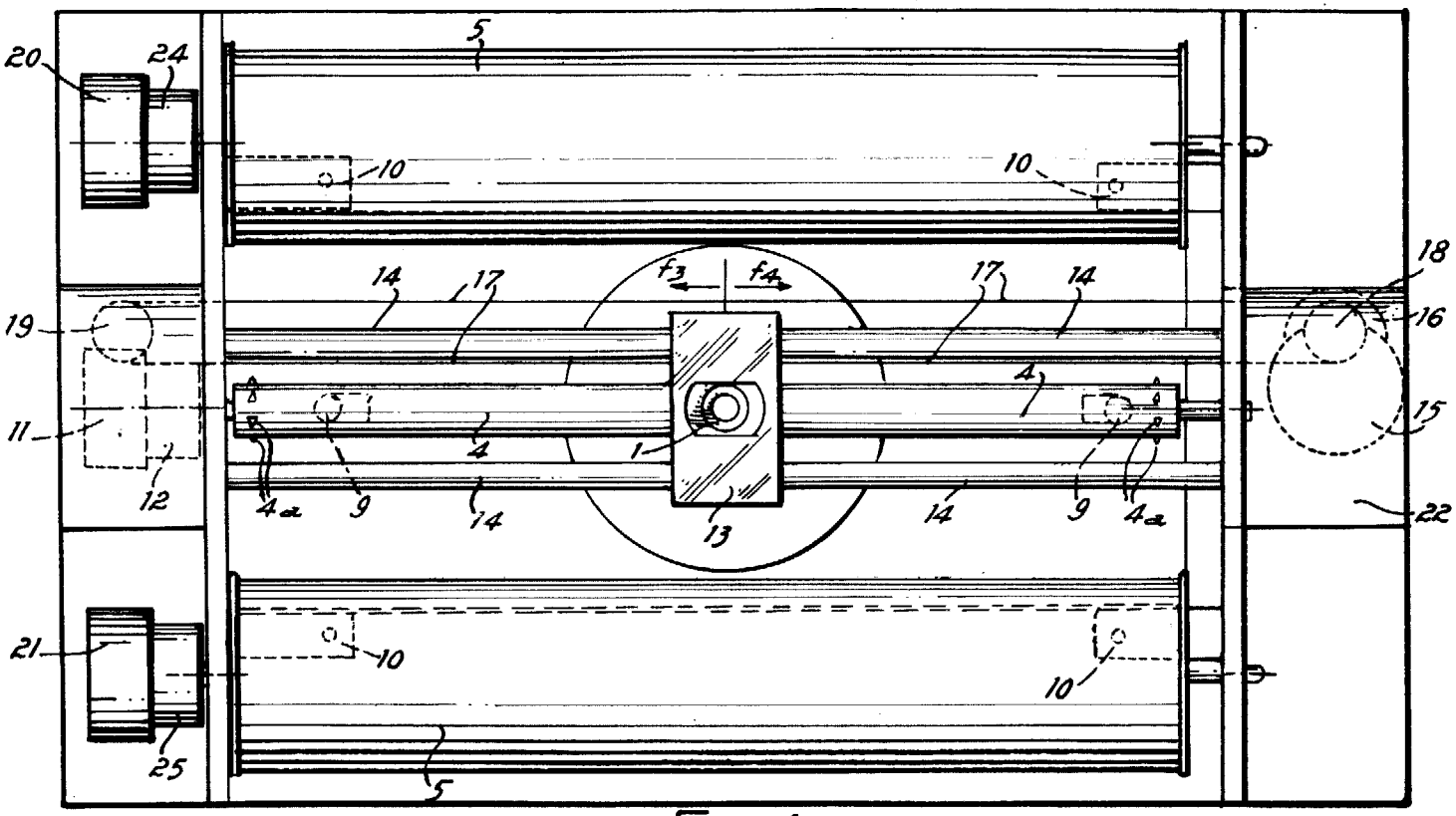
FIG. 4 is a view looking from above the recorder proper.
Figure 5:
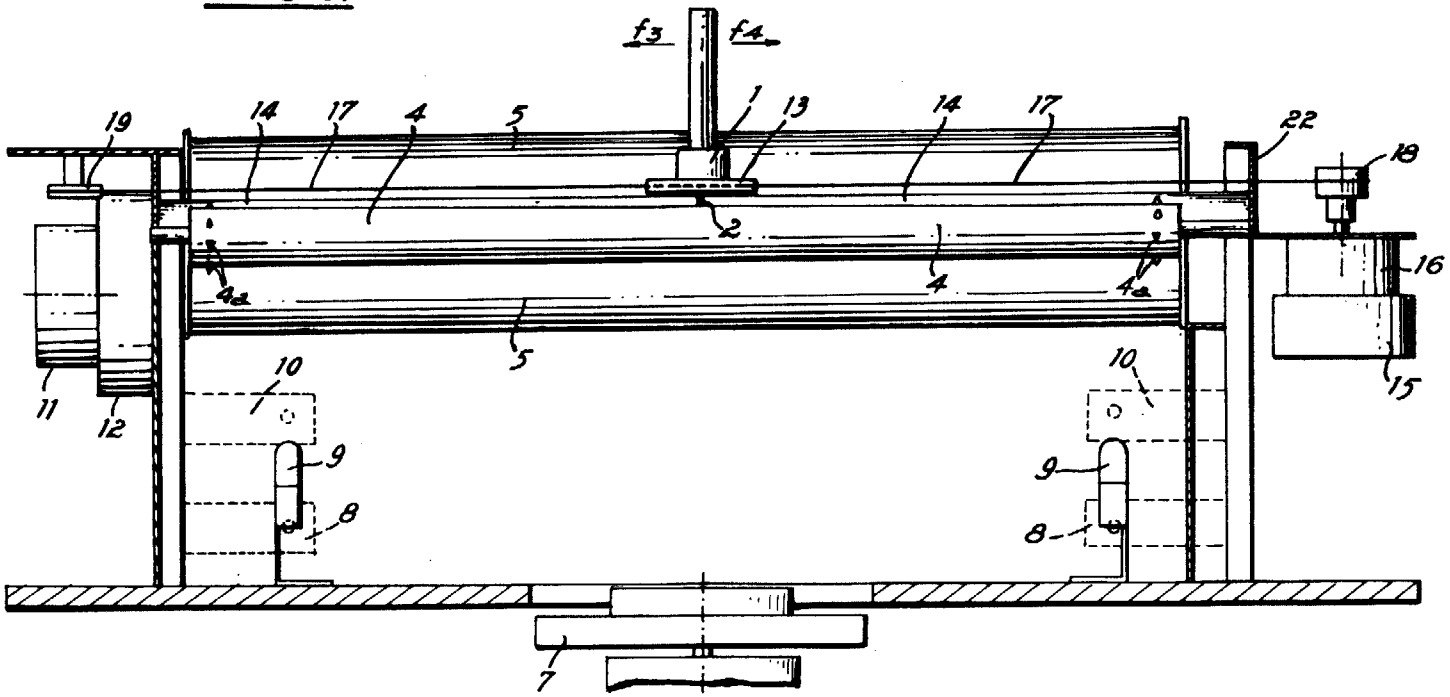
FIG. 5 is a view of the recorder in longitudinal section.

The graphic recorder according to the invention may be arranged horizontally or inclined (arrangement of FIGS. 1 and 2), or in a vertical plane (arrangement shown in FIG. 3).

The unit constituted by the tracing head on its guided slider and the driving device for this slider can be mounted on a pivoted portion of the apparatus so as to permit the sheet of paper to be placed in position. This pivoted portion 22 may be articulated about hinges 23.

In the form of embodiment shown in FIG. 6, the hinges 23 are fixed on one of the side panels of the machine. The pivotal plane corresponds to a plane transverse to the unwinding of the paper. It is clear that it is possible to consider a pivotal mounting of the tracing head and its drive in a plane which is longitudinal to the unwinding of the paper.

The tracing head is of course provided with a conventional device for lifting the pen.

On the drawings shown, there have been provided two pairs of photo-electric cells 8 and 10 at the level of each marginal edge of the paper.

Reduction gears 24 and 25 form the coupling between the constant speed reversible motors 20 and 21 and the rollers 5 which they drive.

In a general way, the above description has only been given by way of indication and not in any limitative sense, and the invention is capable of receiving numerous alternative forms in conformity with its scope.

I claim:

[1. In an instrument for recording information comprising:

a pair of spools with flexible sheet material extending therebetween, an information transferring head, means for displacing said head transversely across the flexible material during transferring of information, a driving means contacting the flexible material between said pair of spools, said driving means including a control spindle being of low rotational inertia and having a minimum diameter compatible with the flexibility of said flexible material, and air pressure means to hold said flexible material against a portion of the surface of said control spindle and applied between said control spindle and each of said pair of spools forming loops therebetween and isolating said control spindle from the inertial action of said spools, whereby said control spindle and said air pressure means positively control movement of said flexible material between said spools.]

[2. A device in accordance with claim 1, further characterized by said air pressure means acting in a direction substantially opposing the direction in which said portion of the surface of said control spindle contacting the flexible material faces.]

[3. A graphic recorder intended to operate automatically from numerical inputs, said recorder comprising:

a recording head, means for displacing said head transversely in two different directions about a sheet of flexible material having perforations in said flexible material, a driving spindle adapted to move said sheet of flexible material in two different directions but perpendicular to the displacement of said recording head, unwinding-winding spools supporting said sheet of flexible material on each side of said driving spindle, said spindle being of low rotational inertia and a minimum diameter compatible with the flexibility of said material and having projections engaging the perforations in said flexible material, air pressure means for maintaining a uniform pressure contact area of said flexible material against and around a sector of said driving spindle, the axis of said spindle and the axes of said unwinding-winding spools spaced from and parallel to each other and spaced from each other a distance sufficient to produce two intermediate loops formed in said sheet of flexible material on each side of said driving spindle, a device for reading and correcting said loops formed in said flexible material whereby the driving spindle is rendered totally independent of any interaction of said winding-unwinding spools.]

*4. An instrument for graphically recording information by providing a visually perceptable image on a web of flexible, wide sheet material comprising:*

*a pair of spools with flexible wide sheet material extending therebetween,*

*a head for graphically transferring information onto said flexible material,*

*means for displacing said head in two different transverse directions across at least a portion of the width of said flexible material during transferring of information,*

*a driving means located opposite said head for contacting said flexible material between said spools and for moving said flexible material in two different longitudinal directions past said head during transferring of information, said directions being perpendicular to the displacement of said head,*

*said driving means including a control spindle of low rotational inertia and having a minimum diameter compatible with the flexibility of said flexible material,*

*and air pressure means to hold said flexible material against a portion of the surface of said control spindle and applied between said control spindle and each of*

*said pair of spools forming loops therebetween and isolating said control spindle from the inertial action of said spools, whereby said control spindle and said air pressure means cooperate to positively control movement of said flexible material past said head without the use of any other drive means for said flexible material.*

*5. A device in accordance with claim 4, further characterized by:*

*said air pressure means acting in a direction substantially opposing the direction in which said portion of the surface of said control spindle contacts the flexible material faces.*

*6. A device in accordance with claim 4, including reversible motor means to rotate said driving means in either direction in accordance with the input signal received by the reversible motor means.*

*7. A device in accordance with claim 6, further characterized by projections extending from said spindle for engaging perforations in said flexible material.*

*8. The instrument of claim 4 wherein said flexible material includes perforations, and said control spindle includes projections for engaging the perforations in said flexible material and wherein said air pressure means causes said flexible material to be sufficiently draped around said control spindle to enable said projections to engage said perforations.*

* * * * *